(12) United States Patent
Mahaffey et al.

(10) Patent No.: US 11,937,741 B2
(45) Date of Patent: Mar. 26, 2024

(54) DISTRIBUTED DISPENSER NETWORK

(71) Applicant: Kimberly-Clark Worldwide, Inc., Neenah, WI (US)

(72) Inventors: Cleary E. Mahaffey, Canton, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 712 days.

(21) Appl. No.: 17/051,698

(22) PCT Filed: Apr. 25, 2019

(86) PCT No.: PCT/US2019/029117
§ 371 (c)(1),
(2) Date: Oct. 29, 2020

(87) PCT Pub. No.: WO2019/212855
PCT Pub. Date: Nov. 7, 2019

(65) Prior Publication Data
US 2021/0093127 A1    Apr. 1, 2021

Related U.S. Application Data (60) Provisional application No. 62/664,731, filed on Apr. 30, 2018.

(51) Int. Cl.
*A47K 10/32* (2006.01)
*A47K 5/12* (2006.01)
(Continued)

(52) U.S. Cl.
CPC ............ *A47K 10/32* (2013.01); *A47K 5/1217* (2013.01); *G06F 9/4818* (2013.01);
(Continued)

(58) Field of Classification Search
CPC ............ A47K 10/32; A47K 2010/3226; A47K 5/1217; G06F 9/4881; G06F 9/4818; G06Q 10/06316
See application file for complete search history.

(56) References Cited

U.S. PATENT DOCUMENTS 5,978,829 A    11/1999  Chung et al.
6,112,225 A *   8/2000  Kraft ..................... G06F 9/5072
                                                        709/227
(Continued)

FOREIGN PATENT DOCUMENTS

CA        2968112 A1    11/2017
CN      101453398 A      6/2009
(Continued)

OTHER PUBLICATIONS

BDS Blog Archive: BDS Vison-Vender, https://www.bdslaundry.com/blog/accessory_cats/soap-venders-coin-laundry/.
(Continued)

*Primary Examiner* — Michael Collins (57) ABSTRACT

A system comprising a plurality of dispensers each configured to dispense a respective hygienic consumable product during a dispense operation and each including a processor and memory; a distributed computing program configured to receive data defining a computational task comprising work streams and generate data assigning the work streams to at least two of the plurality of dispensers, wherein each of the at least two of the plurality of dispensers are configured to use their respective processor and memory to work on their respective work streams; and a data processing apparatus configured to run the distributed computing program.

17 Claims, 4 Drawing Sheets

(51) Int. Cl.
*G06F 9/48* (2006.01)
*G06Q 10/0631* (2023.01)

(52) U.S. Cl.
CPC ..... *G06F 9/4881* (2013.01); *G06Q 10/06316* (2013.01); *A47K 2010/3226* (2013.01)

(56) References Cited

U.S. PATENT DOCUMENTS

| | | | |
|---|---|---|---|
| 7,092,985 | B2 | 8/2006 | Hubbard |
| 8,484,279 | B1* | 7/2013 | Cole ................... G06F 9/5044 709/201 |
| 9,632,834 | B2* | 4/2017 | Kini .................... G06F 9/3851 |
| 9,906,413 | B1 | 2/2018 | Chang et al. |
| 2005/0010664 | A1 | 1/2005 | Hubbard |
| 2012/0073604 | A1 | 3/2012 | Barnhill et al. |
| 2014/0344826 | A1* | 11/2014 | Wu ..................... G06F 9/5066 718/104 |
| 2017/0026441 | A1 | 1/2017 | Moudy et al. |
| 2017/0255489 | A1 | 9/2017 | Abebe et al. |
| 2018/0310780 | A1 | 11/2018 | Mahaffey et al. |
| 2018/0368626 | A1* | 12/2018 | Williams, Jr. ......... A47K 10/24 |
| 2021/0000305 | A1* | 1/2021 | Williams, Jr. ......... G06Q 10/06 |

FOREIGN PATENT DOCUMENTS

| | | |
|---|---|---|
| CN | 107408274 A | 11/2017 |
| JP | 2005339174 A | 12/2005 |
| WO | 17105464 A1 | 6/2017 |

OTHER PUBLICATIONS

ATS Vending Machines, https://web.archive.org/web/20180311014742/https://www.isanvending.com.au./our-vending-machines.

* cited by examiner

DISTRIBUTED DISPENSER NETWORK

This application claims priority from U.S. provisional Patent Application Ser. No. 62/664,731 filed on 30 Apr. 2018, the entire contents of which are incorporated herein by reference.

TECHNICAL FIELD

This disclosure generally relates using hygienic dispensers in a distributed computing network to perform computational tasks different from those used to dispense hygienic consumable products.

BACKGROUND OF THE DISCLOSURE

Systems dispensing consumable hygienic products are ubiquitous in many environments today. For example, paper hand towel dispensers are commonplace in many private, semi-private and public washrooms, work areas, food processing stations and kitchens. Some dispensers include wireless communication components and processors, and are part of a wireless network through which, for example, the dispensers can be monitored to determine the statuses of the dispensers, e.g., low product, low battery, malfunction/jam, etc.

SUMMARY OF THE DISCLOSURE

In general, the subject matter of this specification relates to a system for distributed dispenser computing. One aspect of the subject matter described in this specification can be implemented in systems that include a plurality of dispensers each configured to dispense a respective hygienic consumable product during a dispense operation and each including a processor and memory; a distributed computing program configured to receive data defining a computational task comprising work streams and generate data assigning the work streams to at least two of the plurality of dispensers, wherein each of the at least two of the plurality of dispensers are configured to use their respective processor and memory to work on their respective work streams and further wherein the work streams are different from hygienic dispensing operations; and a data processing apparatus configured to run the distributed computing program. Other embodiments of this aspect include corresponding methods, apparatus, and computer program products.

Another aspect of the subject matter described in this specification can be implemented in a method that includes receiving, at a hygienic dispenser and from a distributed computing program, a work stream, wherein the work stream is one of a plurality of work streams from a computational task; dispensing, by the hygienic dispenser, a hygienic consumable product in response to a user request; and working on the work stream, by the hygienic dispenser, at least one of before and after the dispensing. Other embodiments of this aspect include corresponding systems, apparatus, and computer program products.

Particular embodiments of the subject matter described in this specification can be implemented so as to realize one or more of the following advantages. Electronic hygiene dispensers have memory to store operating instructions, e.g., firmware, and processors (e.g., 32 bit processors) to execute the instructions. Such dispensers often have periods of little dispensing activities and during such times their processors sit mostly idle, or even when dispensing the dispensers have excess computing power/capacity. There can be hundreds of dispensers in a large office building, many thousands of dispensers in a metropolitan area and hundreds of thousands of dispensers across a large geographic region.

The distributed computing system uses the idle times of the dispensers (including their processors), and/or excess computing capacity even when the dispensers are performing dispenses, to handle additional computational tasks assigned to them and managed by a distributed computing program. For example, the distributed computing program is instructed to handle certain actuarial computations from an insurance company or engineering simulations from an academic institution. In turn, the distributed computing program can, optionally, break the task into various work streams and assign the work streams to the dispensers to perform during their idle time or when the dispensers otherwise have excess computing capacity.

The owner of the dispensers can monetize this process to generate additional revenue by charging a fee to third parties for use of the dispensers' computing time. Or if the owner herself has needs for processing, e.g., analytics associated with building management systems or other tasks for which the owner would typically utilize third-party services, the owner could use the dispensers for these needs to avoid the cost of using the third-party services.

The details of one or more implementations of the subject matter described in this specification are set forth in the accompanying drawings and the description below. Other features, aspects, and advantages of the subject matter will become apparent from the description, the drawings, and the claims.

Repeat use of reference characters in the present specification and drawings is intended to represent the same or analogous features or elements of the disclosure.

DETAILED DESCRIPTION OF THE DISCLOSURE

Electronic dispensers include processors and memory to perform dispensing operations and communicate with a central data processing apparatus, e.g., central management system, which can monitor the statuses of the dispensers and control the operation of the dispensers. As computing power in microprocessors and microcontrollers continues to increase, the computing power of dispensers also rises. Although the computational tasks required by modern electronic dispensers has increased, e.g., to handle remote monitoring and control functions, the computing power from current microprocessors/microcontrollers has left many dispensers with excess computing power.

The distributed computing program can accept additional computational tasks, e.g., tasks beyond those normally performed by dispensers, optionally, partition the tasks into work streams and assign the work streams to respective dispensers (or dispenser groups) to process and solve/complete during times when the dispensers are not performing dispensing operations or otherwise when the dispensers have excess computing capacity. The distributed computing program can then consolidate the output from the dispensers to manage the overall completion of the computational tasks. In this way the dispensers are used to solve, in some implementations, computational tasks not related to their normal dispensing operations, for example, those that are not required to perform dispense operations.

Figure 1A:
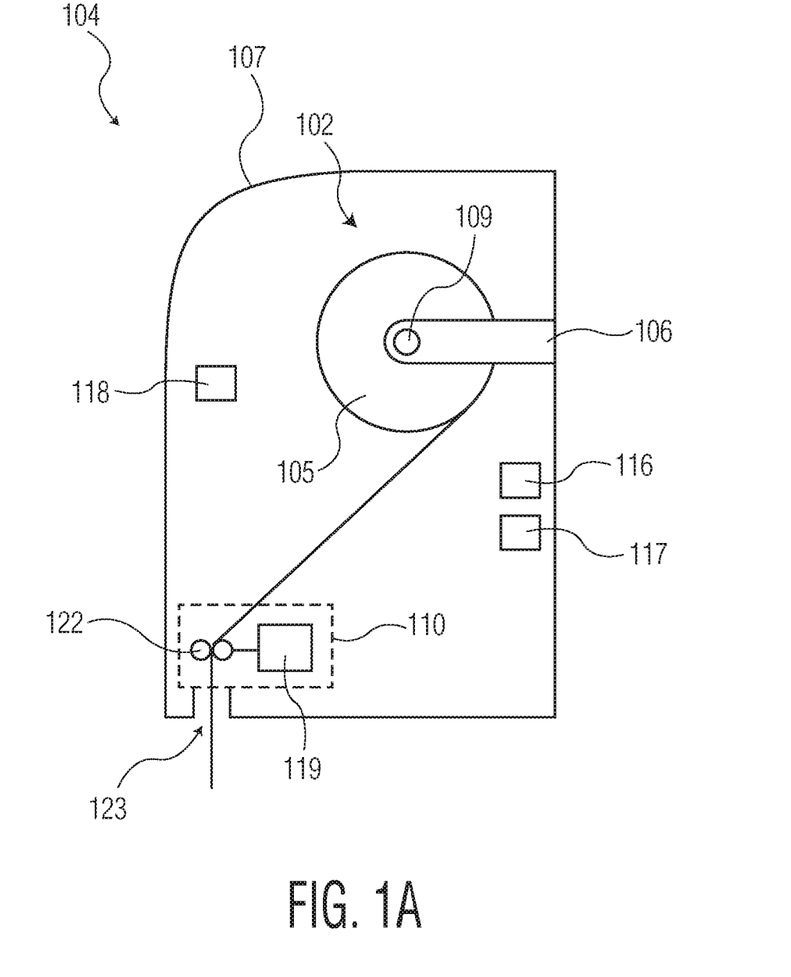
FIG. 1A is a right-side cutaway representation of an example hygiene dispenser.
Figure 1B:
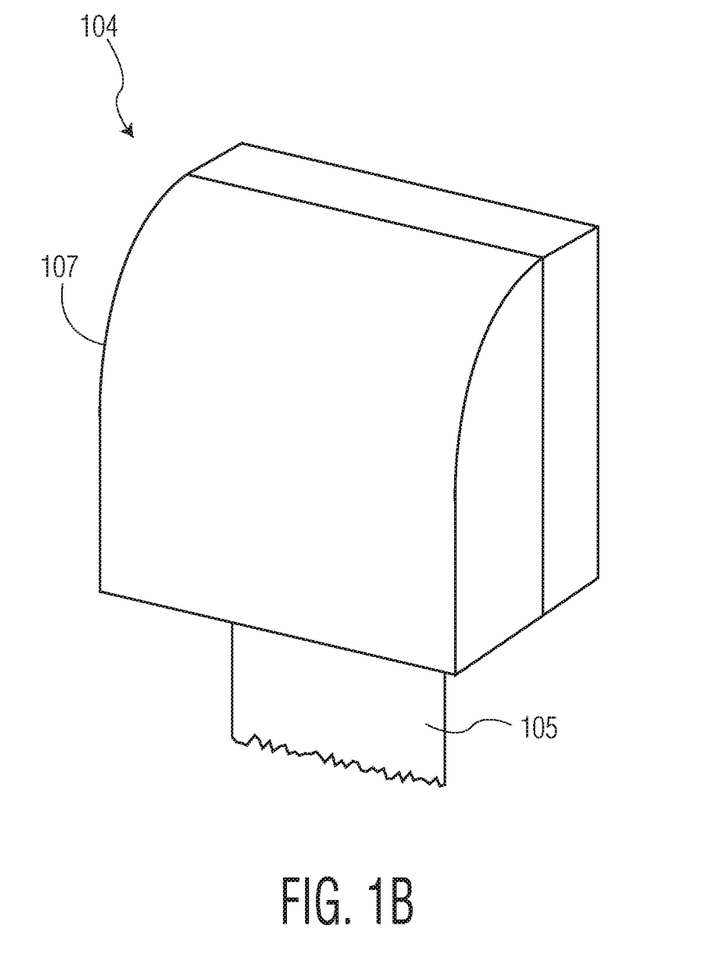
FIG. 1B is a perspective representation of the hygiene dispenser of FIG. 1A.

The operation of the distributed hygiene dispenser computing system 100 is described below in more detail with reference to FIG. 1A, which is a side cutaway representation of an example hygiene dispenser 104; FIG. 1B, which is a perspective representation of the hygiene dispenser 104; and FIG. 1C, which is block diagram of an example environment in which a distributed hygiene dispenser computing system 100 can be implemented.

A hygiene dispenser 104 dispenses consumable hygiene product 105 (e.g., bath tissue, hand towels, hand sanitizer, soap, lotion, deodorizer, etc.), which is a product intended to promote good hygiene or sanitation such as by cleaning or sanitizing a user and/or a surface. In some implementations, a dispenser 104, more generally, is a device that holds consumable hygiene product 105 and dispenses the product 105 in response to a stimulus, e.g., an environmental stimulus (e.g., light/darkness), at pre-determined (e.g., programmatically set) intervals or by manual user actuation such as pulling an exposed portion of the consumable product or via a pumping-type process (e.g., for some manual soap dispensers). Although FIG. 1A shows a rolled product dispenser 104, other hygienic dispensers are also envisioned such as, for example, soap/sanitizer dispensers 104, air fresher dispensers 104 and the like.

The dispenser 104 includes a body 107 or outer cover 107, e.g., a composite or metal housing. The outer cover 107 encloses, fully or partially, a product holding area 102 or interior 102 of the dispenser 104. The product holding area 102 holds, for example, the product-to-be-dispensed 105 by the dispenser 104 and, in some implementations, one or more electrical or mechanical components used to enable the dispense process such as a motor, batteries, rollers, sensors to determine when a user requests a dispense, etc., as described in more detail below.

The dispenser 104 also includes a dispensing mechanism 110. The dispensing mechanism 110 operates to dispense a portion of the consumable product 105 in the holding area 102 (e.g., dispense a length of roll 105 for use to dry hands or a shot of soap 105 or sanitizer to clean hands). In some implementations, for example, for rolled paper towels 105 or wipers 105 or bath tissue 105, the dispensing mechanism 110 is an electromechanical feed mechanism that includes or operates in conjunction with a motor 119 that, in response to a stimulus such as a user waving a hand proximate the dispenser 104, feeds a length of the roll 105 through an opening 123 in the body 107 to present to the user. For example, the dispensing mechanism 110 can include a series of rollers 122 through which a portion of the roll 105 is feed such that when the dispensing mechanism 110 actuates it pulls and unwinds the roll 105 (or causes the roll 105 to be pulled and unwound) to feed a portion of the roll 105 to the user. In some implementations, the motor 119 can be integral to the roll holder 106 and causes a spindle 109 of the roll holder 106 (e.g., on which the rolled product 105 is mounted) to turn thereby causing the roll 105 to unwind and be dispensed. In the case, for example, of a liquid soap or sanitizer or lotion dispenser 104 the motor 119 may be a pump 119 that draws the liquid product from a bottle, cassette or other container holding the liquid product 105 and ejects the drawn product to the user for a dispense operation.

In some implementations, the dispenser 104 is a user-driven dispensing unit, e.g., the dispense process is not powered by a motor or other electromechanical generator. For example, for a rolled paper product dispenser 104 such as a paper towel or bath tissue dispenser 104, a user may grab an exposed tail of the roll 105 and pull to cause more of the product 105 to be dispensed. For a liquid soap or sanitizer dispenser 104, a user may depress or otherwise manually actuate a pump (e.g., dispensing mechanism 110) to draw the product 105 from its container and dispense the product 105.

The dispenser 104 includes a processor 118 such as a microprocessor or microcontroller 118 and a memory 116. The memory 116 stores the instructions for operating the dispenser 104, for example, instructions to cause the motor 119 to actuate to dispense product 105 and to communicate with external devices such as the data processing apparatus 102, described below. The memory 116 can also be used to store additional data, e.g., work stream data. The processor 118 is a device that executes the instructions stored in the memory 116 or otherwise accessible to the processor 118. The processor 118 interfaces with and, in some implementations, controls the operation of other devices/components in the dispenser 104 such as the motor 119 and transceiver 117, which can be used to communicate with external devices.

Figure 1C:
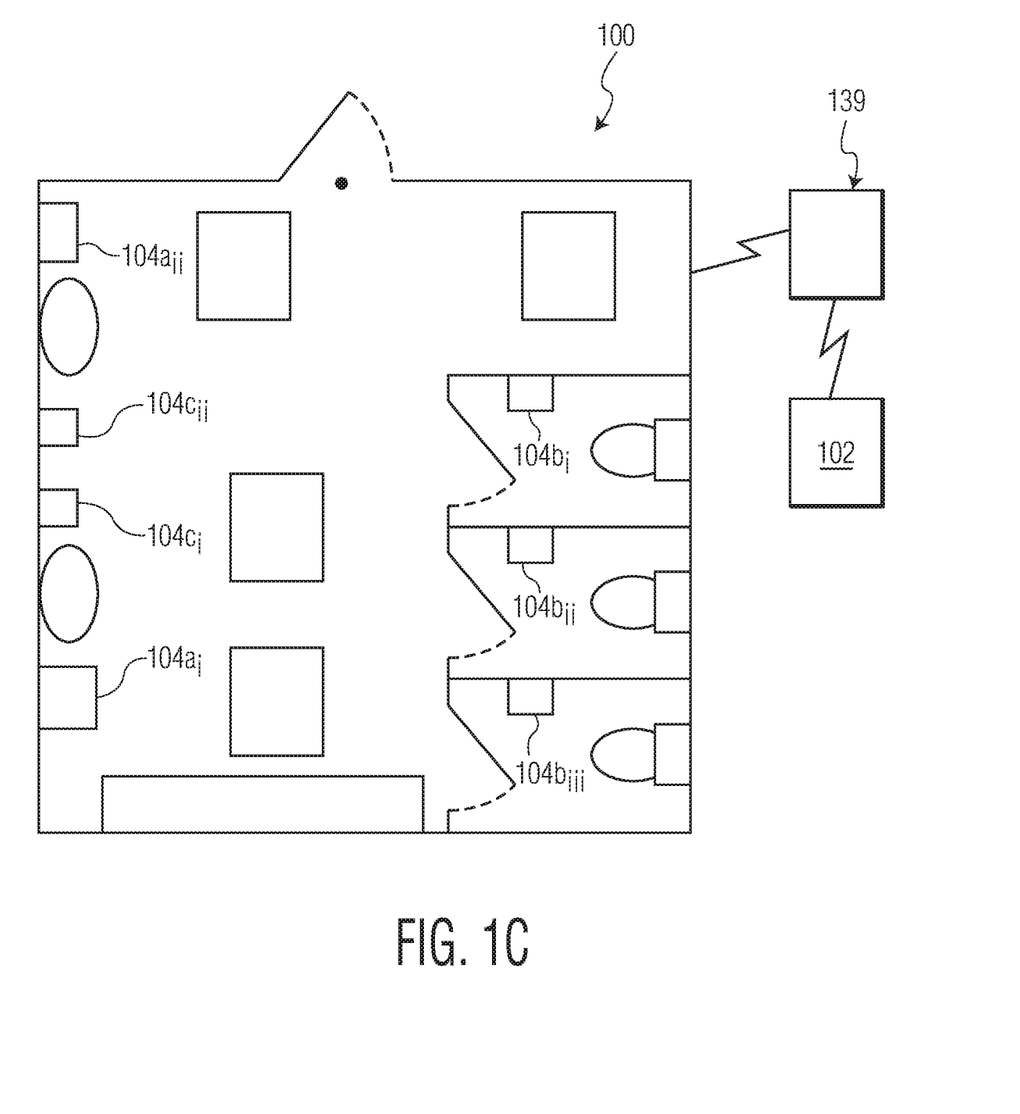
FIG. 1C is a block diagram of an example environment in which a distributed hygiene dispenser computing system can be implemented.

The environment in FIG. 1C includes a facility, e.g., a washroom, two or more dispensers 104, a data processing apparatus 102 and, in some implementations, a gateway 139 to facilitate communications between the dispenser 104 and the data processing apparatus 102. In some implementations, the gateway 139 is a router or other network communication device(s). In some implementations, the dispensers 104 and data processing apparatus 102 can directly communicate. As described above, dispensers 104 can include, for example, a hand towel dispenser 104a, bath tissue dispenser 104b, hand soap (or other cleansing) dispenser 104c, hand or facial care dispenser (not pictured), surface cleaning, sanitizing or disinfecting dispenser (not pictured) including for toilets or urinals, and/or the like.

The data processing apparatus 102, in some implementations, can communicate with dispensers 104 across wireless or wired channels, or some combination thereof, and directly or through intermediaries. For example, the data processing apparatus 102 includes a transceiver and microprocessor to facilitate such communications. In some implementations, the data processing apparatus 102 is connected to a WAN or LAN to communicate to and with the dispensers 104 and other devices such as mobile devices and/or servers. The data processing apparatus 102 runs the distributed computing program, as described in more detail with reference to FIG. 2, which is a block diagram of an example data processing apparatus 102.

Figure 2:
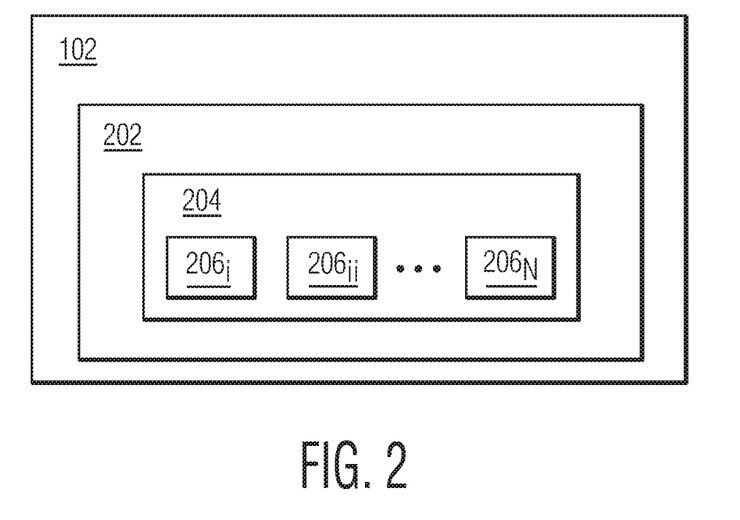
FIG. 2 is a block diagram of an example data processing apparatus.

The distributed computing program 202 is software or a computer program that manages solving or completing a computational task 204, for example, among a set of dispensers 104. In some implementations, the computational task 204 is a task that is not required to be performed to perform a dispenser operation (i.e., the process of the dispenser 104 dispensing product 105). To this end, the distributed computing program 202 accepts data defining the computational task 204, optionally, divides the computational task 204 into work streams $206_1$-$206_n$ and assigns the work streams 206 to the dispensers 104 to solve/complete.

Examples of commercially available systems that facilitate distributed computing include those from Mercury Systems, e.g., Interprocessor Communication System (ICS/DX) software, OpenMPI/OFED libraries, and Protocol Offload Engine Technologies (POET); MATLAB Distributed Computing Server from MATHWORKS; and Apache™ Hadoop®!.

Consider, for example, the computational task 204 of finding the square root of nine. One approach to solving this task is to raise each integer from one on to the second power until the result is nine. As such, distributed computing program 202 or another software application can generate work streams from this task, which could be work streams to solve $1^2$; $2^2$, $3^3$, and $4^4$; corresponding to work streams 2061, 2062, 2063 and 2064. The distributed computing program 202 can assign these work streams 206 to the dispensers 104 based on one or more schemes. For example, assume there are four dispensers, Dispensers A, B, C, and D 104. The distributed computing program 202 could, for example, assign the work streams 206 in a predefined sequential order always starting with Dispenser A, determine which dispensers 104 have the greatest computing capacity available, e.g., by consulting a list of all outstanding work streams 206 with the dispensers 104 (created by the distributed computing program 202 when it assigns work streams 206 and updates to track completed work streams) and assign the new work streams 206 to the dispensers 104 with the most available capacity. For purposes of the above example, the distributed computing program 202 assigns the work streams 206 to the dispensers 104 according to the pre-defined scheme of Dispenser A, then Dispenser B, then Dispenser C, and then Dispenser D, and then returns to Dispenser A for the next work stream and continues with the same sequence.

As such work streams $206_1$, $206_2$, $206_3$ and $206_4$ are respectively assigned to Dispenser A, Dispenser B, Dispenser C, and Dispenser D. The dispensers 104 then return, respectively, results of 1, 4, 9, and 16 to the distributed computing program 202. The distributed computing program 202 then matches work stream 2063 result to the computational task and determines the square root of nine is three. More generally, the distributed computing program 202 send data defining the work streams 206 to the dispensers 104. The dispensers 104 receive their respective work stream data (defining the work stream), store some or all of the data in their memory 116 and use their processors 118 to execute the instructions in the work stream data to work on the work streams 206.

Figure 3:
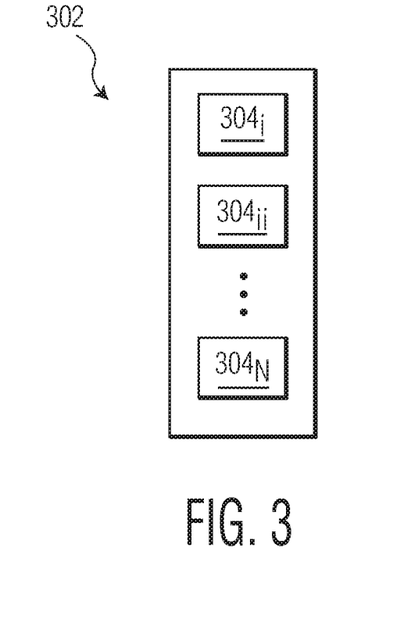
FIG. 3 is a block diagram of example instruction data.

In some implementations, distributed computing program 202 provides instruction data 302 to the dispensers 104 defining a priority level 304 of the work stream 206, as shown, for example, in FIG. 3, which is a block diagram of example instruction data 302. In some implementations, the distributed computing program 202 assigns multiple work streams 206 to a given dispenser 104. In such implementations, the distributed computing program 202 can optionally provide instruction data defining prioritization levels 304 for the various assigned work streams 206 to instruct the dispenser 104 as to how to prioritize the work streams 206. For example, consider Dispenser A was assigned work streams $206_1$, $206_2$, $206_3$ and $206_4$. The instruction data 302 could specify the order/priority in which Dispenser A should work on the work streams 206, for example, the instruction data 302 prioritizes the work streams 206 in the following order: $206_2$, $206_4$, $206_3$, and $206_1$.

The instruction data 302 can additionally, or alternatively, specify a time period during which the dispenser 104 should work on the work stream(s) 206. Depending, for example, on the type of dispenser 104, its location, type of facility it is in (e.g., office building or school) and the use profile of the dispenser 104, the instruction data 302 can specify a time period or first task time period, e.g., from 11 pm to 3 am on Saturdays and Sundays or outside of business hours, during which the dispenser 104 should work on the work stream 206 as, for example, it is likely that the dispenser 104 will not be used heavily in its capacity as a hygienic product provider and will thus have computing capacity to work on the work streams 206. In some implementations, in any event, the dispenser 104 will interrupt work stream work or temporarily de-prioritize work stream work during the time period to perform a dispense operation to dispense hygienic product (e.g., in accord with the instruction data 302). Such de-prioritization can be, for example, reducing the computing resources directed to the work stream work to enable a dispenser operation, as necessary, but still carrying on with the work stream work during the dispense operation, i.e., concurrently performing a dispensing operation and working on the work stream.

The operation of the distributed dispenser system 100 is described in more detail below with reference to the below example method.

A work stream is received at a hygienic dispenser from a distributed computing program. The work stream is one of multiple that together define a computational task. For example, a dispenser 104 receives a work stream 206 from the distributed computing program 202.

The hygienic dispenser dispenses a hygienic consumable product in response to a user request. For example, the dispenser 104 dispenses hand soap to a user in response to the user triggering a proximity sensor on the dispenser 104.

The hygienic dispenser works on the work stream at least one of before or after the dispensing. For example, the dispenser 104 performs a dispense operation and then resumes working on a work stream 206.

Embodiments

Embodiment 1. A system comprising a plurality of dispensers each configured to dispense a respective hygienic consumable product during a dispense operation and each including a processor and memory; a distributed computing program configured to receive data defining a computational task comprising work streams and generate data assigning the work streams to at least two of the plurality of dispensers, wherein each of the at least two of the plurality of dispensers are configured to use their respective processor and memory to work on their respective work streams and further wherein the work streams are different from hygienic dispensing operations; and a data processing apparatus configured to run the distributed computing program.

Embodiment 2. The system of embodiment 1, wherein the at least two of the plurality of dispensers are configured to use their respective processor and memory to perform their respective dispense operations.

Embodiment 3. The system of any proceeding embodiment, wherein assigning the work streams to at least two of the plurality of dispensers comprises providing instruction data defining a priority level of the work stream.

Embodiment 4. The system of embodiment 3 wherein instruction data define a time during which to work on the work streams.

Embodiment 5. The system of embodiment 4, wherein the time is outside of business hours.

Embodiment 6. The system of any proceeding embodiment, wherein the plurality of dispensers include at least two of hand towel dispensers, bath tissue dispensers, and hand soap dispensers.

Embodiment 7. The system of any proceeding embodiment, wherein the distributed computing program is configured to receive data from the at least two of the plurality of dispensers defining a respective status of the work streams Embodiment 8. The system of any proceeding embodiment, wherein assigning the work streams to at least two of the plurality of dispensers comprises providing instruction data defining causing the at least two plurality of dispensers to deprioritize work on the work streams during the dispense operations.

Embodiment 9. The system of any proceeding embodiment, wherein the data processing apparatus is remote to the plurality of dispensers.

Embodiment 10. A system comprising a first and a second dispenser each configured to dispense a hygienic consumable product during a dispense operation and each including a processor and memory; a distributed computing program configured to receive data defining a computational task comprising a first work stream and a second work stream and generate data assigning the first work stream to the first dispenser and the second work stream to the second dispenser, wherein the first dispenser is configured to use its processor and memory to work on the first work stream during a first task time period and interrupt the first task time period to stop working on the first work stream and perform the dispense operation during the interruption to the first task time period; and a data processing apparatus configured to run the distributed computing program.

Embodiment 11. The system of embodiment 10, wherein the second dispenser is configured to use its processor and memory to work on the second work stream during a second task time period and interrupt the second task time period to stop working on the second work stream and perform the dispense operation during the interruption to the second task time period.

Embodiment 12. The system of any of embodiments 10-11, wherein assigning the first work stream to the first dispenser and the second work stream to the second dispenser comprises providing instruction data defining a priority level for each of the first and second work streams.

Embodiment 13. The system of any of embodiments 10-12, wherein the first and second dispensers include one or more of a hand towel dispenser, a bath tissue dispenser, and a hand soap dispenser.

Embodiment 14. A method comprising receiving, at a hygienic dispenser and from a distributed computing program, a work stream, wherein the work stream is one of a plurality of work streams from a computational task; dispensing, by the hygienic dispenser, a hygienic consumable product in response to a user request; and working on the work stream, by the hygienic dispenser, at least one of before or after the dispensing.

Embodiment 15. The method of embodiment 14, wherein the hygienic dispenser comprising a processor and a memory and working on the work stream comprising using the processor and memory to work on the work stream.

Embodiment 16. The method of embodiment 15, wherein working on the work stream comprising completing the work stream.

Embodiment 17. The method of embodiment 16 comprising sending, to the distributed computing program by the hygienic dispenser, data indicating that the work stream is complete.

Embodiment 18. The method of embodiment 14, wherein the work stream is different from work streams used for the dispensing.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium (or memory) can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system (or processor) encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may affect alterations, modifications and variations to the examples without departing from the scope of the invention.

What is claimed is:

1. A system comprising:
a plurality of dispensers each configured to dispense a respective hygienic consumable product during a dispense operation and each including a processor and memory;
a distributed computing program configured to receive data defining a computational task comprising work streams and generate data assigning the work streams to at least two of the plurality of dispensers, wherein each of the at least two of the plurality of dispensers are configured to use their respective processor and memory to work on their respective work streams, and further wherein the work streams are different from hygienic dispensing operations, and wherein assigning the work streams to at least two of the plurality of dispensers comprises providing instruction data defining a time during which to work on the work streams where the time is based on one or more of a type of dispenser, a location of the dispenser and a use profile of the dispenser; and
a data processing apparatus configured to run the distributed computing program.

2. The system of claim 1, wherein the at least two of the plurality of dispensers are configured to use their respective processor and memory to perform their respective dispense operations.

3. The system of claim 1, wherein assigning the work streams to at least two of the plurality of dispensers comprises providing the instruction data defining a priority level of the work stream.

4. The system of claim 1, wherein the time is outside of business hours.

5. The system of claim 1, wherein the plurality of dispensers include at least two of hand towel dispensers, bath tissue dispensers, and hand soap dispensers.

6. The system of claim 1 wherein the distributed computing program is configured to receive data from the at least two of the plurality of dispensers defining a respective status of the work streams.

7. The system of claim 1, wherein assigning the work streams to at least two of the plurality of dispensers comprises providing instruction data causing the at least two plurality of dispensers to deprioritize work on the work streams during the dispense operations.

8. The system of claim 1, wherein the data processing apparatus is remote to the plurality of dispensers.

9. A distributed dispenser computing system comprising:
a first and a second dispenser each configured to dispense a hygienic consumable product during a dispense operation and each including a processor and memory;
a distributed computing program configured to receive data defining a computational task comprising a first work stream and a second work stream and send data assigning the first work stream to the first dispenser and the second work stream to the second dispenser, wherein the first dispenser is configured to use its processor and memory to work on the first work stream during a first task time period and interrupt the first task time period to stop working on the first work stream and perform the dispense operation during the interruption to the first task time period; and
a data processing apparatus configured to run the distributed computing program.

10. The system of claim 9, wherein the second dispenser is configured to use its processor and memory to work on the second work stream during a second task time period and interrupt the second task time period to stop working on the second work stream and perform the dispense operation during the interruption to the second task time period.

11. The system of claim 9, wherein assigning the first work stream to the first dispenser and the second work stream to the second dispenser comprises providing instruction data defining a priority level for each of the first and second work streams.

12. The system of claim 9, wherein the first and second dispensers include one or more of a hand towel dispenser, a bath tissue dispenser, and a hand soap dispenser.

13. A method comprising:
receiving, at a hygienic dispenser and from a distributed computing program, a work stream, wherein the work stream is one of a plurality of work streams from a computational task;
dispensing, by the hygienic dispenser, a hygienic consumable product in response to a user request;
working on the work stream, by the hygienic dispenser;
interrupting the work stream, by the hygienic dispenser, to perform a dispense operation; and
resuming the work stream, by the hygienic dispenser, after completion of the dispense operation.

14. The method of claim 13, wherein the hygienic dispenser comprising a processor and a memory and working on the work stream comprising using the processor and memory to work on the work stream.

15. The method of claim 14, wherein working on the work stream comprises completing the work stream.

16. The method of claim 15 comprising sending, to the distributed computing program by the hygienic dispenser, data indicating that the work stream is complete.

17. The method of claim 13, wherein the work stream is different from work streams used for the dispensing.

* * * * *